(12) United States Patent
Liu et al.

(10) Patent No.: US 10,528,348 B2
(45) Date of Patent: Jan. 7, 2020

(54) DATA MANAGEMENT METHOD FOR STORAGE MEDIA

(71) Applicant: Seagate Technology LLC, Cupertino, CA (US)

(72) Inventors: Xiong Liu, Singapore (SG); WenXiang Xie, Singapore (SG); Quan Li, Singapore (SG); Jian Qiang, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/914,598

(22) Filed: Mar. 7, 2018

(65) Prior Publication Data

US 2019/0278594 A1 Sep. 12, 2019

(51) Int. Cl.
| | | |
|---|---|---|
| *G06F 12/02* | (2006.01) | |
| *G06F 12/08* | (2016.01) | |
| *G06F 9/30* | (2018.01) | |
| *G06F 12/0893* | (2016.01) | |
| *G06F 12/0866* | (2016.01) | |
| *G11B 20/10* | (2006.01) | |
| *G11B 20/12* | (2006.01) | |

(52) U.S. Cl.
CPC .......... *G06F 9/3004* (2013.01); *G06F 12/023* (2013.01); *G06F 12/0866* (2013.01); *G06F 12/0893* (2013.01); *G11B 2020/10898* (2013.01); *G11B 2020/1238* (2013.01)

(58) Field of Classification Search
CPC .. G06F 3/3004; G06F 12/023; G06F 12/0866; G06F 12/0893
USPC .......................................... 711/206, 207, 209
See application file for complete search history.

(56) References Cited

U.S. PATENT DOCUMENTS

| | | | | |
|---|---|---|---|---|
| 5,459,853 | A | * 10/1995 | Best | G06F 3/0601 711/111 |
| 9,098,421 | B2 | 8/2015 | Zaw et al. | |
| 9,594,628 | B2 | * 3/2017 | Toh | G06F 11/1044 |
| 10,394,493 | B2 | * 8/2019 | Tang | G11B 5/012 |
| 2012/0303930 | A1 | * 11/2012 | Coker | G11B 5/012 711/207 |
| 2013/0321948 | A1 | * 12/2013 | Bandic | G11B 5/09 360/75 |
| 2016/0012849 | A1 | * 1/2016 | Feldman | G06F 3/0608 360/48 |
| 2017/0220264 | A1 | * 8/2017 | Sokolov | G06F 3/0611 |

* cited by examiner

*Primary Examiner* — Pierre Miche Bataille
(74) *Attorney, Agent, or Firm* — Holzer Patel Drennan (57) ABSTRACT

In one implementation, this disclosure provides a method for executing a partial band rewrite operation comprising identifying a first track of a shingled data band to receive data of a write received at a shingled media storage device and writing a first subset of the received data to a media cache, where the first subset corresponds to the first track of the shingled data band to receive data of the write command. The method also includes writing a remaining subset of the received data to target locations within the shingled data band without updating data on the first track within the shingled data band corresponding to the first subset of the received data.

20 Claims, 6 Drawing Sheets

DATA MANAGEMENT METHOD FOR STORAGE MEDIA

BACKGROUND

As requirements for data storage density increase for magnetic media, cell size decreases. One technique for adapting the magnetic medium to utilize smaller cells while preventing adjacent data from being overwritten during a write operation is shingled magnetic recording (SMR). SMR allows for increased areal density capability (ADC) as compared to conventional magnetic recording (CMR) but at the cost of some performance ability. As used herein, CMR refers to a system that allows for random data writes to available cells anywhere on a magnetic media. In contrast to CMR systems, SMR systems are designed to utilize a write element with a write width that is larger than a defined track pitch. As a result, changing a single data cell within a data track entails re-writing a corresponding group of shingled (e.g., sequentially increasing or decreasing) data tracks.

In SMR systems, a risk of data degradation exists due to an effect known as adjacent track erasure (ATE). Some systems implement one or more integrity-assurance techniques, such as direct offline scans or periodic track re-writes, to monitor and reduce data degradation. Better data management techniques are desired to reduce a strain on processing resources and increase storage device performance while achieving or improving upon the ADC of these existing systems.

SUMMARY

In one implementation, this disclosure provides a method for executing a partial band rewrite operation comprising identifying a first track of a shingled data band to receive data of a write received at a shingled media storage device and writing a first subset of the received data to a media cache, where the subset corresponds to the first track of the shingled data band to receive data of the write command. The method also includes writing a remaining subset of the received data to corresponding target locations within the shingled data band without updating data on the first track within the shingled data band corresponding to the first subset of received data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

Figure 1:
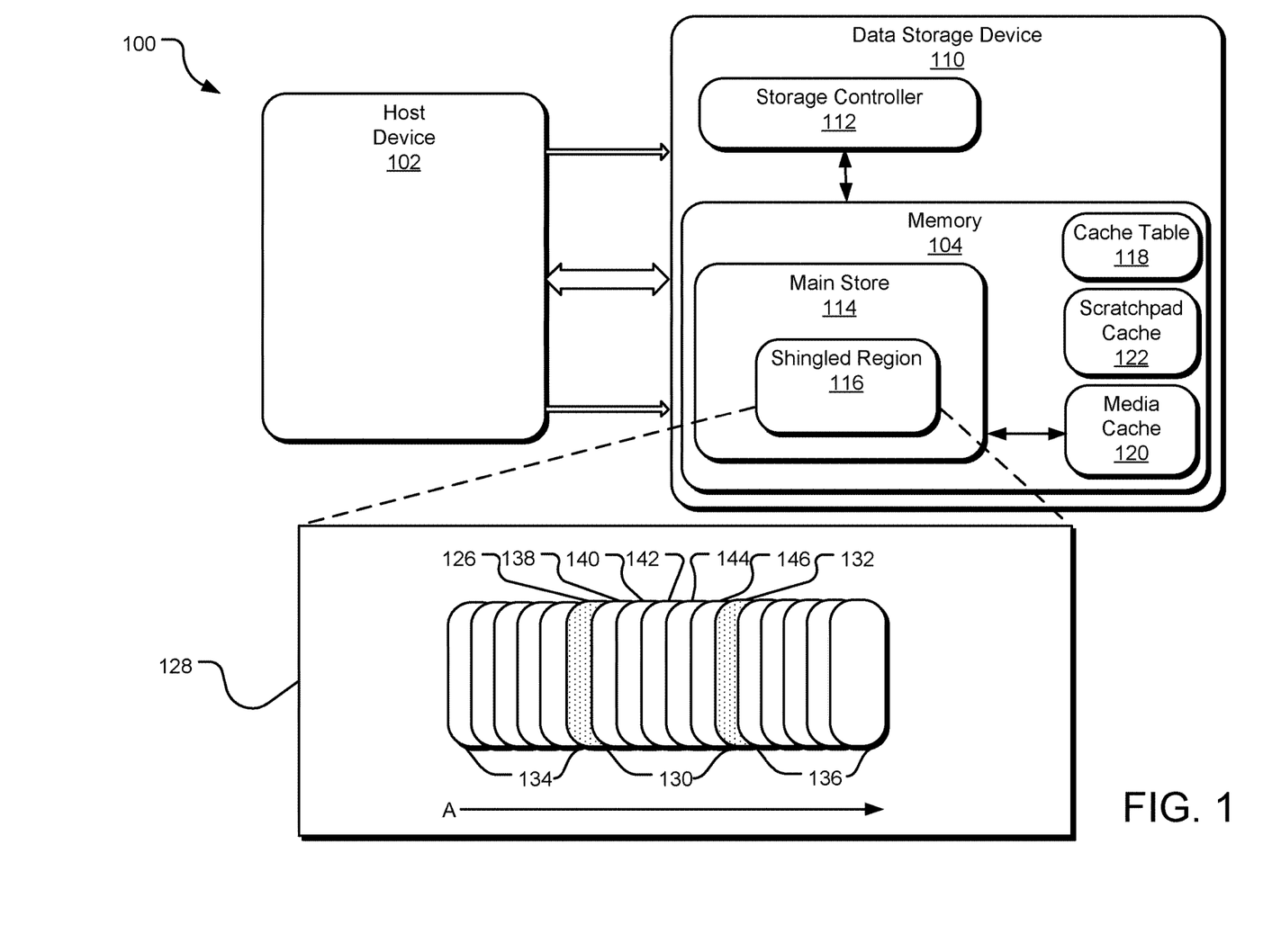
FIG. 1 illustrates a block diagram of an example data storage device system.

FIG. 1 illustrates a block diagram of an example data storage device system 100, showing various functional components used to control the operation of a data storage device 110 (e.g., and SMR HDD, an SMR SSHD, and object storage device, etc.). The system 100 includes a computing or host device 102 (e.g., a computer, a mobile device, the internet, etc.) communicatively coupled to the data storage device 110, each of the host device 102 and the data storage device 110 communicating with each other.

Read or write commands sent by the host device 102 to the data storage device 110 are sent to a storage controller 112 located on the data storage device 110. The storage controller 112 includes software and/or hardware for executing read and write commands to read data from or write data to a memory 104 on the data storage device 110. In various implementations, various aspects of the controller 112 are stored in the memory 104, which may include one or more of a variety of tangible media (excluding carrier waves and communication signals), including both volatile memory and/or nonvolatile memory hard disk drives and solid state hybrid drives, store data on magnetic media, as well as optical media, solid state media such as NAND, NVRAM, Resistive RAM (ReRAM), Magnetic RAM (MRAM), Phase Change Memory (PCM), and other memory technologies.

In FIG. 1, the memory 104 on the data storage device includes at least a main store 114. In one implementation, the main store 114 is included on a non-volatile media (e.g., a magnetic disk) and includes physical data blocks that are each mapped to a logical block address (LBA) utilized by host device when reading and writing data. The main store 114 includes at least a shingled region 116 where data is stored according to a SMR technique. In some implementations, main store 114 is divided into different regions that store data according to different storage techniques (e.g., a combination of shingled regions and unshingled regions).

In addition to the main store, the memory 104 of FIG. 1 additionally includes a cache table 118, a media cache 120, and a scratchpad cache 122, the purposes of which are discussed in greater detail below. In some implementations, the scratchpad cache 122 may be combined with the media cache 120.

The shingled region 116 of the main store 114 includes a plurality of bands of shingled data. For example, an exploded view 128 shows three shingled bands of tracks (e.g., shingled data bands 130, 134, and 136) located within the main store 114. The individual bands of tracks are separated by regions also referred to herein as "guard tracks" where no data is stored. In exploded view 128, for example, a guard track 126 separates the data band 134 from the data band 130, while another guard track 132 separates the data band 130 from the data band 136. Guard track 132 may be erased partially or fully during the writing of a track 146.

As mentioned above, the physical data blocks in the main store 114 are each mapped to an LBA used by a host device when reading and writing data. Accordingly, each data track in the shingled data band 130 has a series of LBAs associated with it. In one implementation, each write command received by the storage controller 112 contains data, an LBA indicating a start address for the write operation, and the size of the data write. Within each data band, data is written according to a consecutive sequence of LBAs in a sequential track write order as indicated by an arrow "A". The storage controller has access to a mapping of LBAs to physical block addresses (PBAs) corresponding to physical locations in the shingled data band 130.

Data written to the shingled region 116 is stored according to a shingled magnetic recording (SMR) technique. SMR is a method of recording data used to increase data storage density. In non-shingled magnetic media, each of the cells on a magnetized medium are of a sufficiently large size relative to the size of the write pole to write data to the cells without overwriting data in any surrounding cells. As a result, data may be written to available cells anywhere on the magnetic medium. However, as requirements for data storage density increase for magnetic media, cell size decreases. A commensurate decrease in the size of the write pole is difficult because a smaller write pole provides a weaker write field gradient, which makes it difficult to shift the polarity of the cells on the magnetized medium. SMR allows the use of smaller cells while using a larger write pole with a stronger write field gradient by writing a track of data to partially overlap an adjacent data track, resulting in a "shingled" track structure, such as that of the shingled data band 130 in the exploded view 128.

When data is written to the shingled data band 130 in the shingled region 116, the data is written according to the sequential track write order indicated by the arrow "A." Since each pass of the write element magnetizes a region larger than a defined track width, an update to an individual data track may entail reading and re-writing several other data tracks unchanged by the write operation.

When data is updated on an individual data block of a data track (e.g., the data track 138), the storage controller 112 identifies data blocks in the data band that follow the updated data block according to the sequential write order, reads these identified blocks into memory, performs the update according to the write operation, and re-writes the identified data blocks from memory. As a consequence of this, the storage controller 112 implements some operations where an entire data band is read into memory and re-written (referred to herein as a full band re-write operation (BRO)) and other operations where a consecutive subset of the data band is read into memory and re-written (referred to herein as a partial BRO).

In an example full BRO, the storage controller 112 receives a write command from the host device 102 to update data on data track 138 of the shingled data band 130 and reads each of the data tracks of the data band (e.g., 138, 140, 142, 144, and 146) into a cache (e.g., scratchpad cache 122). The new data directed to track 138 is then merged in memory with the read data for the data track 138, the updated data track 138 is re-written, and each of the other data tracks 140, 142, 144, 146 is re-written to the shingled data band 130 according to the sequential write order.

In an example partial BRO, the storage device controller 112 receives a write command that instructs an update to data already stored on the track 144 and the track 146 in the shingled data band 130. Since a write command that updates track 144 and track 146 may write directly to track 144 and track 146 without affecting the data tracks 138, 140, and 142 the tracks 138, 140, and 142 are not—in this particular type of write operation—read into memory and re-written. As a result, repeated updates to the data track 144 result in multiple re-writes of the tracks 144 and 146, but no re-writes of the data tracks 138, 140, and 142. This can cause the adjacent and un-altered data track (142) to become victim to ATE.

In general, the term ATE refers to data corruption that occurs when a target track is updated one or more times during an interval in which an adjacent track is not updated. The adjacent track can, in this case, become corrupted gradually due to stray magnetic fields of the write to the target data track. For example, when the track 144 is updated multiple times during a time interval wherein the track 142 is not updated, stray magnetic fields of these writes can affect the integrity of the data on track 142, corrupting the data on track 142. If not monitored and corrected, ATE can cause significant degradation of tracks on shingled data bands over repeated partial BRO operations.

To prevent the significant degradation of tracks due to partial BROs, some storage devices implement scanning techniques to monitor for track degradation, referred to herein as "direct offline scanning (DOS)" techniques. DOS measures degradation to a particular data track, such as degradation due to ATE. During the DOS, data is read back from a data track. An error correction code repairs errors in the read data to the extent possible, and a degradation management module counts a number of correctable read errors. If the number of correctable read errors satisfies an error threshold, the degradation management module may elect to rewrite the data of that data track to repair data degradation. DOS provides a method of tracking data degradation due to ATE and a process for repairing data tracks that have been subject to data degradation, but running DOS uses additional system resources and adds processing time.

The disclosed method prevents data degradation due to ATE in shingled data bands as a result of partial BROs without the need for DOS techniques. In one implantation, this goal is realized by writing the first data track targeted by each partial BRO operation to the media cache 120 instead of the corresponding target data track in the main store 114. Using the example of a partial BRO to update the track 144 and the track 146 of the shingled data band 130, the disclosed method writes the data directed to track 144 to the media cache 120. Then, data directed to the track 146 is written to the shingled data band 130, as described above with reference to the partial BRO. The data directed to the track 144 is stored on the media cache 120, so there is no degradation of the track 142 due to ATE. Further, any degradation of the track 144 on the shingled data band 130 is inconsequential, because the data that logically corresponds to LBAs of the track 144 resides within the media cache 120 instead of within the shingled data band 130.

The storage device controller 112 may access the cache table 118 to determine whether data associated with a particular LBA resides in the media cache 120. The cache table 118 includes the LBAs that logically correspond to data stored in the media cache 120. After the above-described partial BRO is executed to update the track 144 and the track 146 of the shingled data band 130, the storage device controller 112 updates the cache table 118 to include LBAs associated with the track 144. When a read command is received from the host device 102, the cache table 118 may be referenced in executing the read command to determine where data corresponding to each LBA in the read command is stored.

In one implementation, the storage controller 112 monitors activity of the host device 102, and, when there is no activity on the host device 102, the storage controller 112 moves valid data from the media cache 120 to the corresponding shingled tracks in the main store 114. For example, the storage device controller may move the valid data of the data track 144 from the media cache 120 to the track 144 by executing a full BRO of the data band 130. During this BRO, the entire shingled data band 130 is read into the scratchpad cache 122, updated to include the valid data of the track 144 from the media cache 120, and re-written according to the sequential write order.

Figure 2:
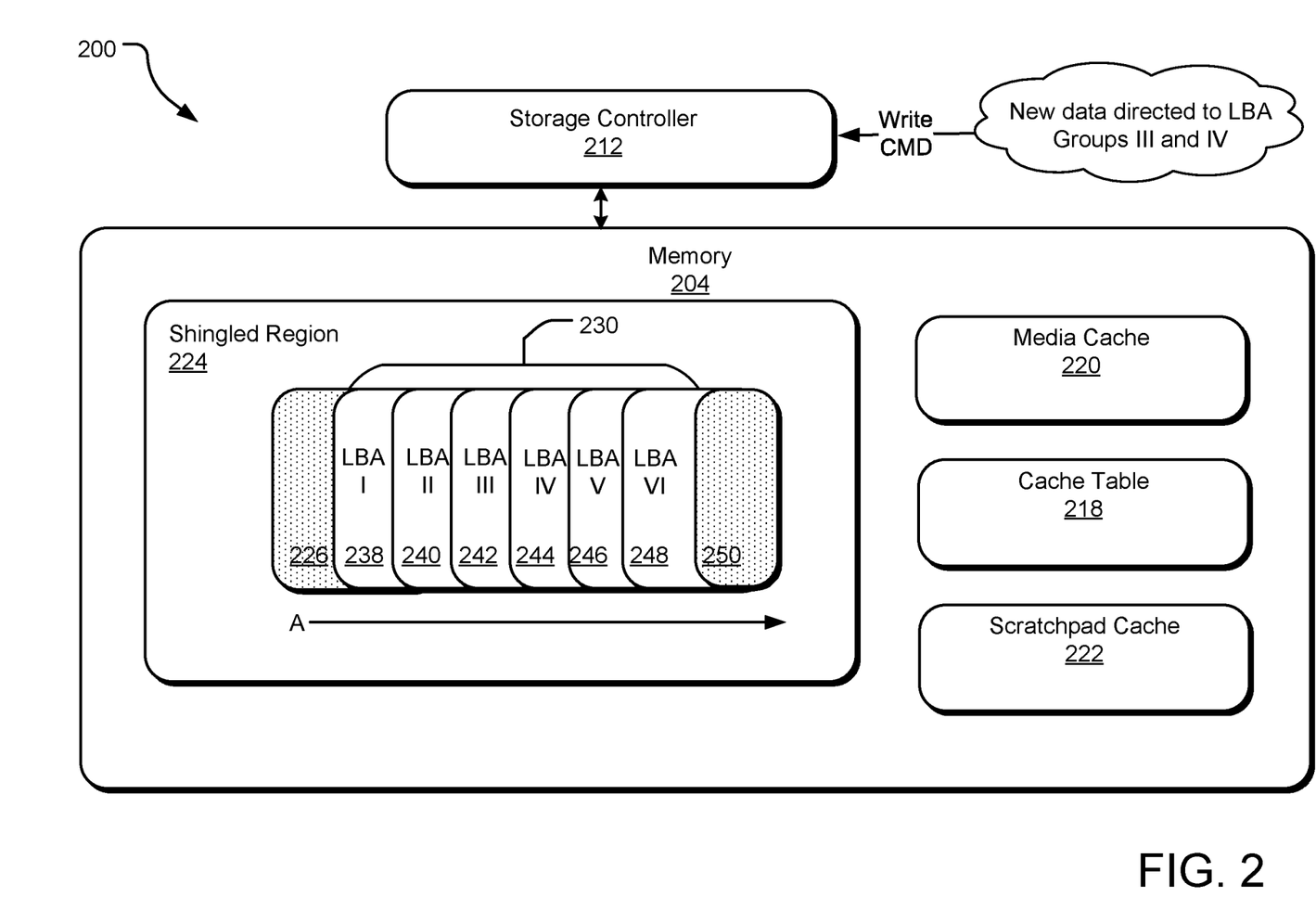
FIG. 2 illustrates an example data storage device before a partial band rewrite operation (partial BRO).

FIG. 2 illustrates an example data storage device 200 before a partial BRO. The data storage device 200 includes a storage controller 212 and a memory 204. The memory 204 includes a shingled region 224 storing a plurality of bands of shingled data. The shingled region 224 shows one shingled band 230. The memory 204 may also include regions where data is stored in a conventional arrangement in addition to the shingled region. The memory 204 also includes a media cache 220, a cache table 218, and may include a scratchpad cache 222. The cache table 218 includes the LBAs of data that logically correspond to data stored in the media cache 220. The purpose of the cache table is discussed in greater detail with respect to FIG. 5.

As shown in FIG. 2, user data is stored on the shingled data band 230. The individual bands of tracks are separated by guard tracks, where no data is stored. In the shingled region 224, for example, a guard track 226 separates the data band 230 from one adjacent data band (not shown) and guard track 250 separates the data band 230 from a second adjacent data band (not shown). The data band 230 includes tracks 238, 240, 242, 244, 246, and 248. Each of the tracks 238, 240, 242, 244, 246, and 248 are currently storing data corresponding to LBA groups I-VI, where each of the numerals I-VI denotes a consecutive subset of LBAs.

Before a partial BRO is executed, the storage controller 212 receives a write command. For the purposes of the example shown in FIGS. 2-5, the write command specifies new data corresponding to at least some of the logical blocks in LBA Groups III and IV. The storage controller 212 recognizes this data as being directed to track 242 and track 244. The storage controller 212 executes logic for a partial BRO because track 242 is not the first track in the band.

Figure 3:
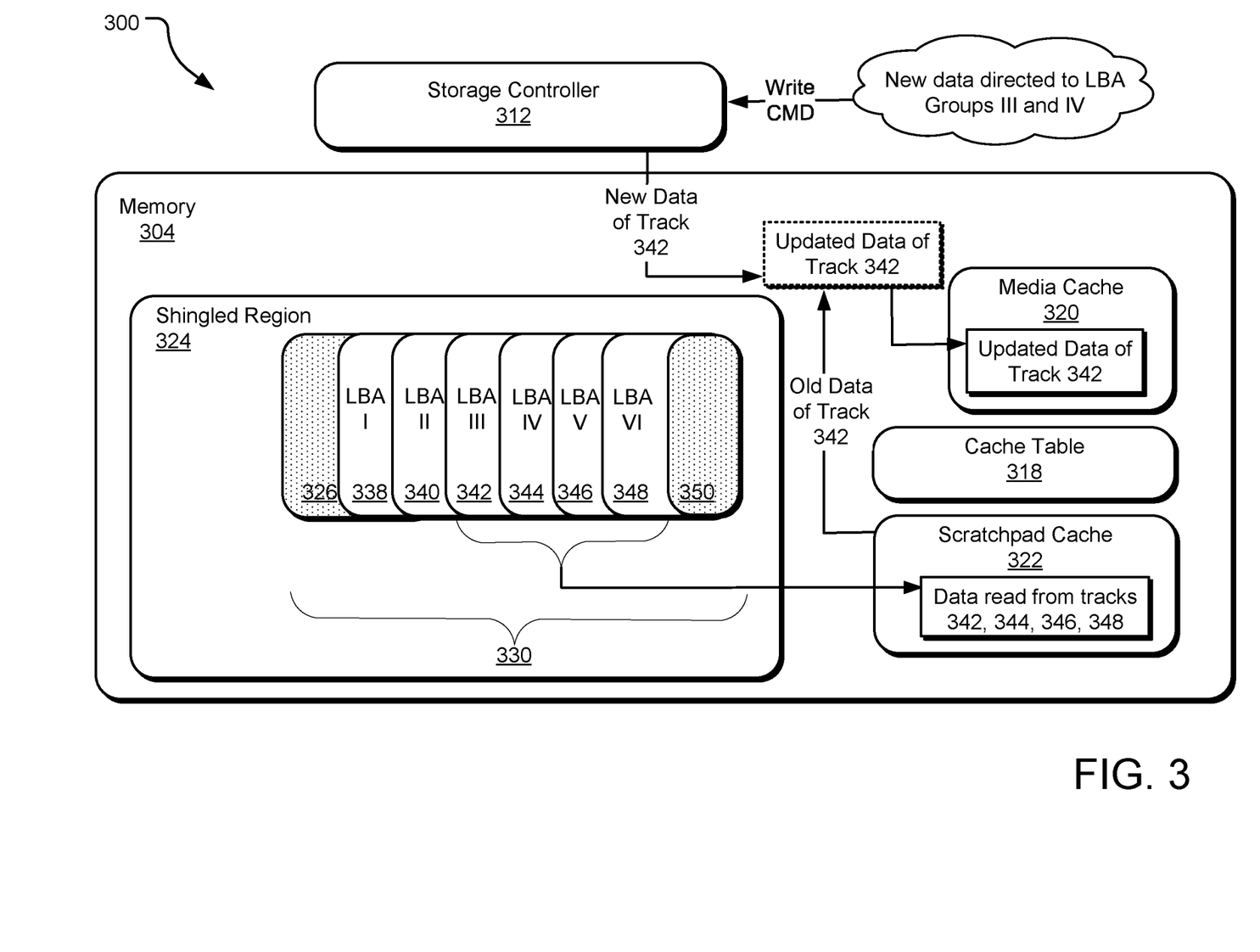
FIG. 3 illustrates an example data storage device during a first phase of execution of a partial BRO.

FIG. 3 illustrates an example data storage device 300 during a first phase of execution of a partial BRO. A storage controller 312 has recently received a write command specifying that new data is to be written to a data band 330 on a shingled region 324 of the data storage device 300. The storage controller 312 has determined that the write operation starts with an LBA that does not correspond to the first track in the data band 330 and has begun to execute logic for a partial BRO.

The storage controller 312 identifies track 342 as the first track to receive data of the write command. The storage controller 312 then reads the data of tracks 342, 344, 346, and 348, copies the read data, and writes the data to a scratchpad cache 322. In volatile memory (not shown), the storage controller 312 modifies the old data of track 342 with the new data of track 342 received from the write command to create updated data of track 342. The updated data of track 342 is written to a media cache 320. In another implementation, the received write command includes new data for every LBA corresponding to the first track 342. Because the write command includes new data for every LBA corresponding to the track 342, the storage controller 312 may not read the data of track 342 and write the data of track 342 into the scratchpad cache 322. Similarly, if the write command includes new data for every LBA corresponding to tracks 344, 346, or 348, the track composed of entirely new data may not be written to the scratchpad cache 322.

Figure 4:
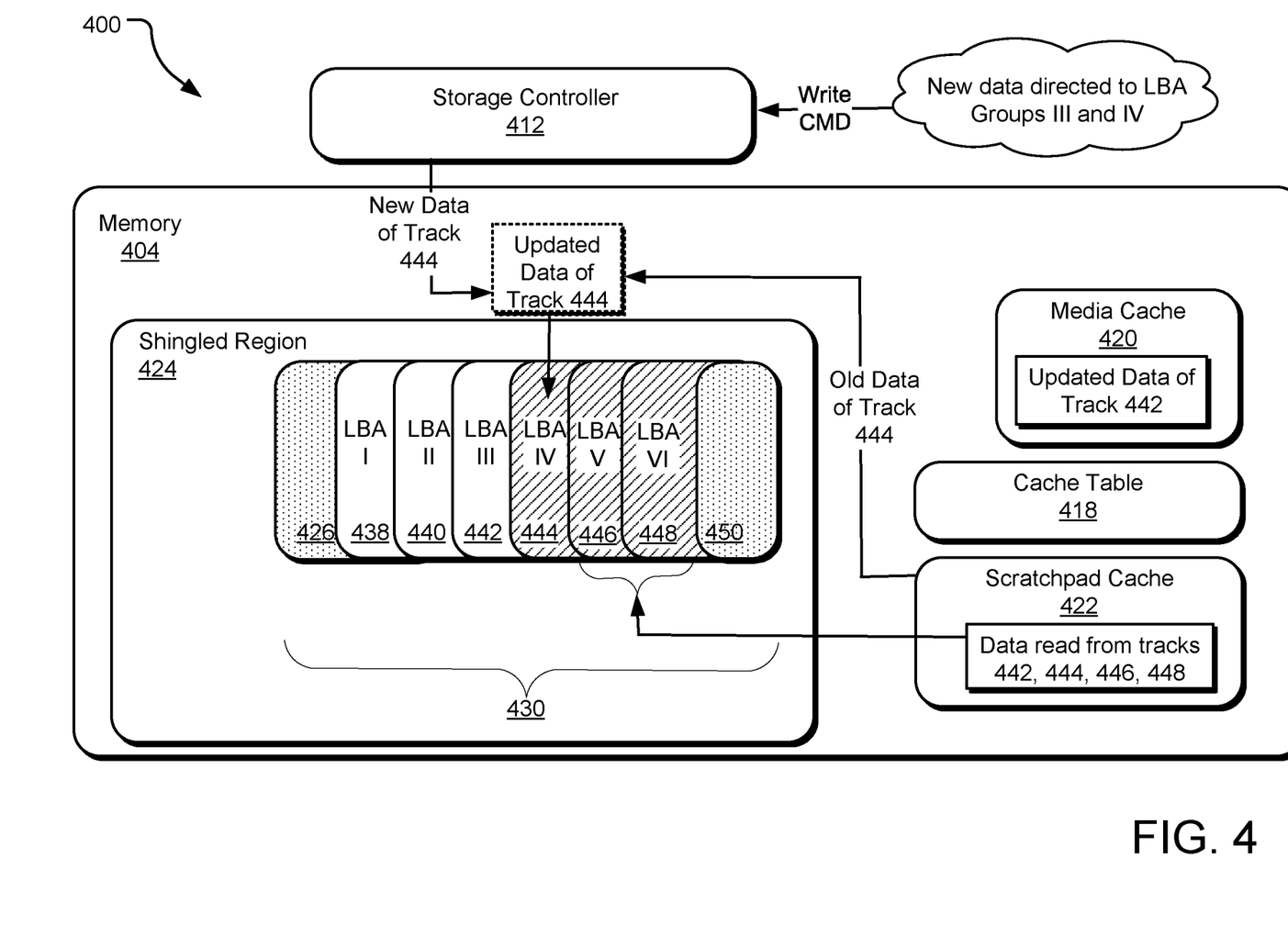
FIG. 4 illustrates an example data storage device during a second phase of execution of a partial BRO.

FIG. 4 illustrates an example data storage device 400 during a second phase of execution of a partial BRO. After the updated data of a track 442 is stored to a media cache 420, a storage controller 412 modifies the old data of track 444 to include new data of track 444 specified by a write command to create updated data of track 444. The updated data of track 444 is written back to track 444 of a data band 430 within a shingled region 424 of the data storage device 400. Next, data of track 446 and track 448 are re-written to the data band 430 unchanged, from the data stored in a scratchpad cache 422.

Figure 5:
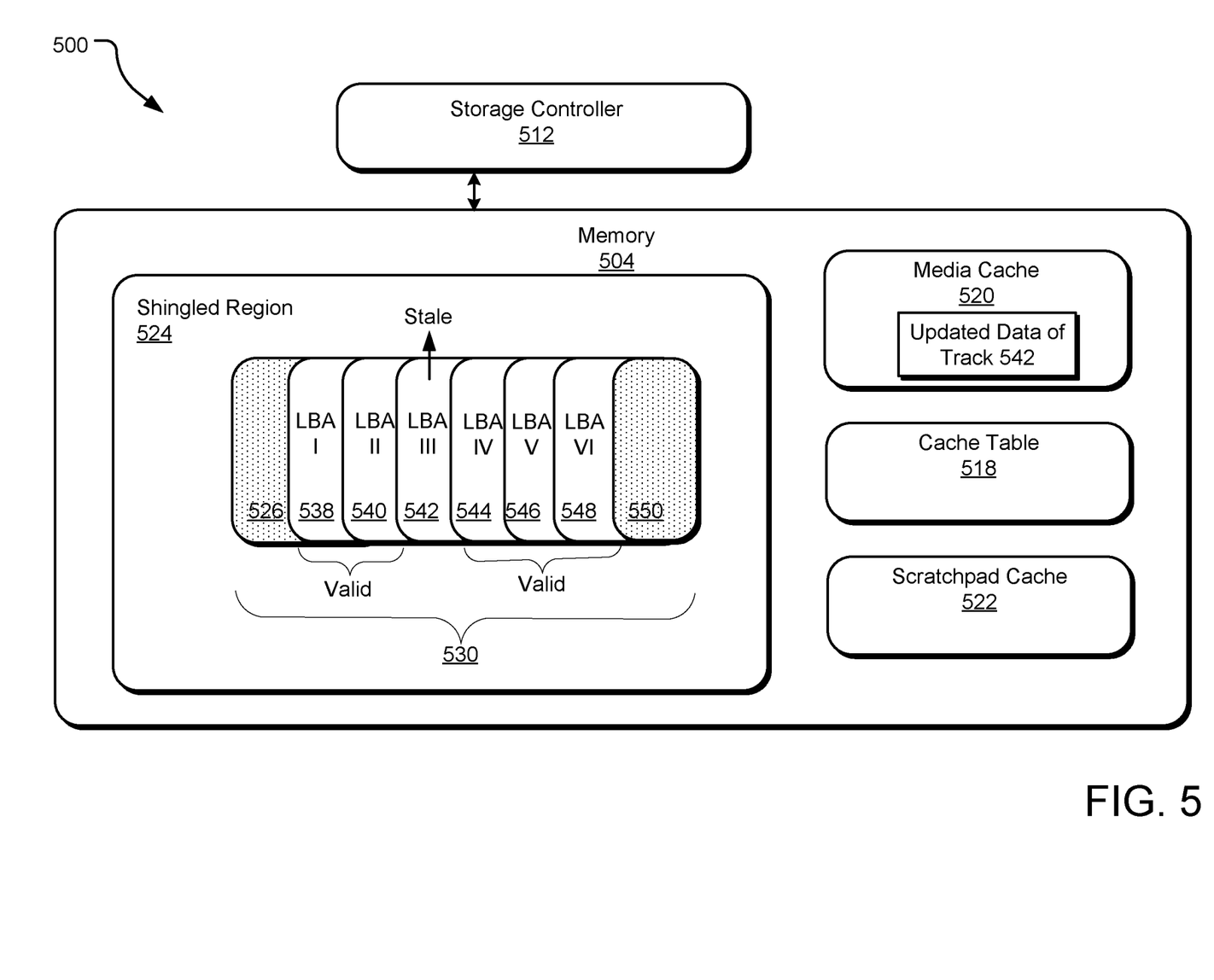
FIG. 5 illustrates an example data storage device after the execution of a partial BRO.

FIG. 5 illustrates an example data storage device 500 after the execution of a partial BRO using a method disclosed herein. To prevent a track 540 from becoming victim to ATE as a result of multiple partial BROs beginning at a track 542 in a data band 530, the partial BRO executed prior to FIG. 5 writes the updated data corresponding to track 542 on a media cache 520 located on a memory 504. As a result, the track 542 within the data band 530 stores stale data, while the other tracks of the data band 530 store valid data. Because the data corresponding to track 542 is not written to the shingled data band 530, track 540 is not affected by stray magnetic fields that would be a result of writing directly to track 542. Further, because the data corresponding to track 542 is located within the media cache 520, the data corresponding to track 542 is not affected by the stray magnetic fields resulting from writing data to track 544.

After the data corresponding to track 542 is written to the media cache 520, a cache table 518 is updated to reflect that the data corresponding to track 542 is stored within the media cache 520 by including the LBAs logically corresponding to track 542 in the cache table 518. The cache table 518 may be referenced by a storage controller 512 during read operations to ensure that the most recent version of the user data is read from the correct location.

Figure 6:
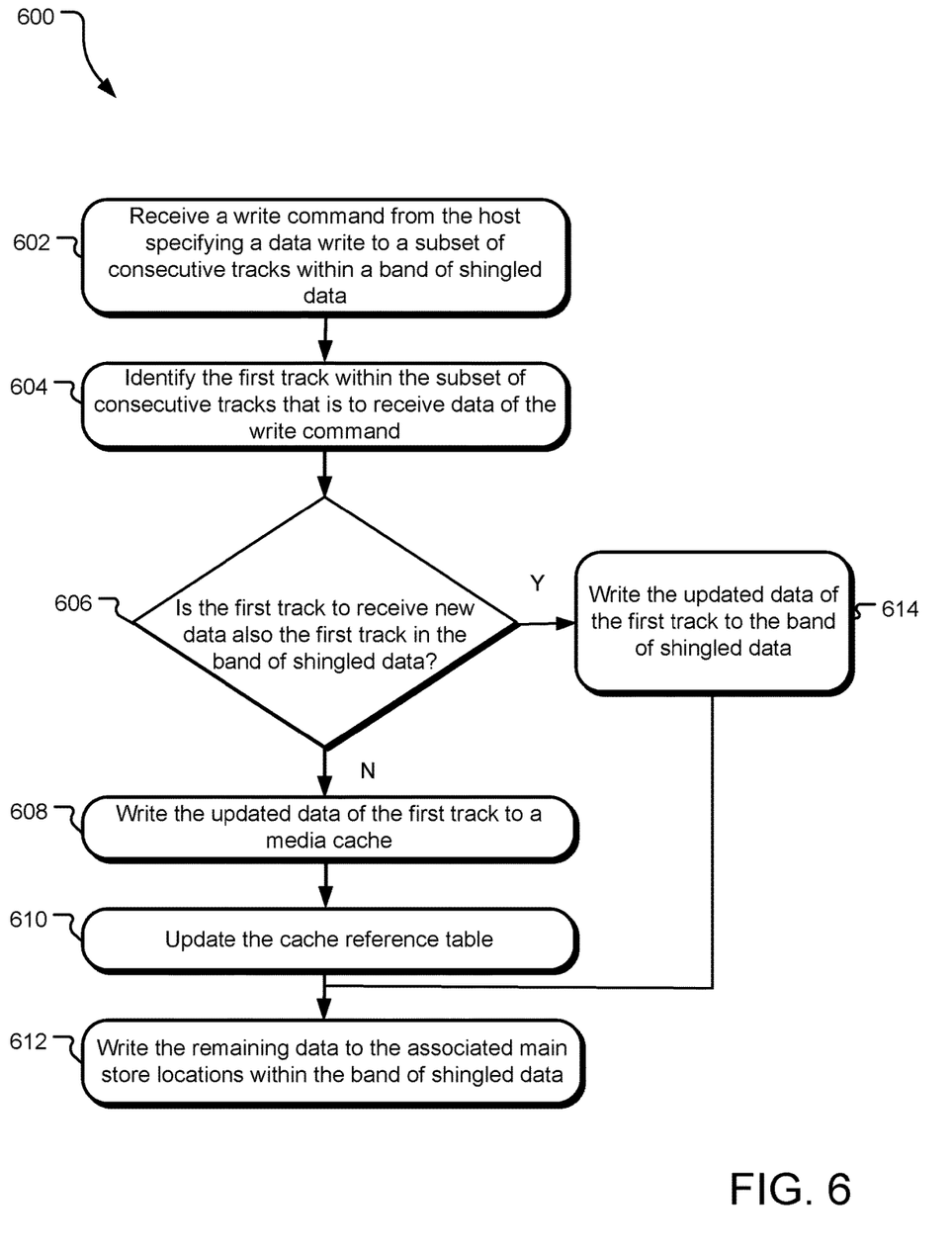
FIG. 6 illustrates example operations for executing a partial BRO of a shingled data band by storing a subset of data directed to the first track of the shingled data band within a cache.

FIG. 6 illustrates example operations 600 for executing a partial band rewrite operation of a shingled data band by storing a subset of data directed to the first track of the shingled data band within a cache. In a receiving operation 602, a storage controller receives a write command from a host specifying a data write to a subset of consecutive tracks within a band of shingled data. The received write command includes an LBA indicating a start address for the write operation, the size of the data write, and the data to be written.

An identifying operation 604 identifies the first track within the subset of consecutive tracks that is to receive data from the write command. The first track within the subset of consecutive tracks that is to receive data from the write command may be identified by the storage controller using the starting LBA received as part of the write command. Once the first track within the subset of consecutive tracks to receive data from the write command is identified, a determining operation 606 determines whether the first track to receive data from the write command is also the first track in the band of shingled data. The determination is important because if the first track to receive data from the write command is also the first track in the band of shingled data, ATE is not issue. The determination may be made by the storage controller using information from the identifying operation 604.

If the first track to receive data is not the first track of the shingled data band, a writing operation 608 writes valid data of the first track, including any new data, on the media cache. After the data directed to the first track to receive data is stored on the media cache, an updating operation 610 updates a cache reference table. The cache reference table includes LBAs logically corresponding to data stored in the media cache. In the updating operation 610, the cache reference table updates to include LBAs logically corresponding to the data directed to the first track to receive data.

Finally, a writing operation 612 writes the remaining data to the associated memory locations within the shingled band of data.

Returning to the determining operation 606, when the first track to receive data is the first track in the band of shingled data, a writing operation 614 writes the updated data of the first track to the shingled band of data. Then, the writing operation 612 writes the remaining data to the associated main store locations within the band of shingled data. In some implementations, the entire band is written to a scratchpad cache located on the storage device that is separate from the media cache. Writing the entire band to a cache ensures that the data in later tracks is preserved during the rewrite. After the band is written into a cache, the full band is rewritten, merging the new data for the tracks receiving new data with the data written to the cache.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A system comprising:
a storage media system including a shingled storage area and a media cache; and a storage controller configured to:
identify a first track of a plurality of sequential tracks of a shingled data band on the storage media to receive data of a write command received at the shingled media storage device;
identify a first subset of the received data that corresponds to the first track;
write the first subset of the received data to the media cache;
identify a remaining subset of the received data that corresponds to a remaining number of tracks of the plurality of sequential tracks; and
write the remaining subset of the received data to corresponding target locations within the shingled data band without updating data on the first track of the shingled data band, first track read commands being served from the media cache and remaining track read commands being served from the corresponding target locations within the shingled data band.

2. The system of claim 1, wherein the first subset of the received data corresponds to a first consecutive subset of logical block addresses (LBAs) in a series of LBAs and the remaining subset of the received data corresponds to a second consecutive subset of LBAs in the series, the first consecutive subset being continuous with the second consecutive subset.

3. The system of claim 1, wherein the storage controller is further configured to write the first subset to the media cache by:
reading data of the first track and the remaining number of tracks;
writing the read data into a scratchpad cache; and
modifying, in volatile memory, the read data to include the received data of the write command.

4. The system of claim 3, wherein the storage controller is further configured to write the first subset to the media cache by:
determining that the first track to receive the data of the write command is also a first track of the shingled data band according to a sequential write order; and
writing the first subset of the received data to the media cache responsive to the determining operation.

5. The system of claim 1, wherein the media cache is included in a non-volatile memory cache.

6. The system of claim 1, wherein the storage controller is further configured to:
copy the first subset of data from the media cache to the corresponding first data track at a time when there is no host activity.

7. A method comprising:
identifying a first track of a plurality of sequential tracks of a shingled data band of a shingled media storage device to receive data of a write command received at the shingled media storage device;
identifying a first subset of the received data that corresponds to the first track;
writing the first subset of the received data to a media cache;
identifying a remaining subset of the received data that corresponds to a remaining number of tracks of the plurality of sequential tracks; and
writing the remaining subset of the received data to corresponding target locations within the shingled data band without updating data on the first track of the shingled data band, first track read commands being served from the media cache and remaining track read commands being served from the corresponding target locations within the shingled data band.

8. The method of claim 7, wherein the first subset of the received data corresponds to a first consecutive subset of logical block addresses (LBAs) in a series of LBAs and the remaining subset of the received data corresponds to a second consecutive subset of LBAs in the series, the first consecutive subset being continuous with the second consecutive subset.

9. The method of claim 8, further comprising:
updating a cache reference table to include the first consecutive subset of LBAs corresponding to the first subset of the received data and the first track of the shingled data band.

10. The method of claim 7, wherein writing the first subset to the media cache comprises:
reading data of the first track and the remaining number of tracks;
writing the read data into a scratchpad cache; and modifying, in volatile memory, the read data to include the received data of the write command.

11. The method of claim 10, wherein writing the first subset of the received data to the media cache further comprises:
determining that the first track to receive the data of the write command is also a first track of the shingled data band according to a sequential write order; and
writing the first subset of the received data to the media cache responsive to the determining operation.

12. The method of claim 7, wherein the media cache is included in a non-volatile memory cache.

13. The method of claim 7, further comprising:
copying the first subset of the received data from the media cache to the corresponding first data track at a time when there is no host activity.

14. One or more computer-readable storage media encoding computer-executable instructions for executing on a computer system a computer process for executing partial band rewrite operations on a storage media system including a shingled media storage device and a media cache, the computer process comprising:
identifying a first track of a plurality of sequential tracks of a shingled data band of a shingled media storage device to receive data of a write command received at the shingled media storage device;
identifying a first subset of the received data that corresponds to the first track;
writing the first subset of the received data to a media cache;
identifying a remaining subset of the received data that corresponds to a remaining number of tracks of the plurality of sequential tracks; and
writing the remaining subset of the received data to corresponding target locations within the shingled data band without updating data on the first track of the shingled data band, of the shingled data band, first track read commands being served from the media cache and remaining track read commands being served from the corresponding target locations within the shingled data band.

15. The one or more computer-readable storage media of claim 14, wherein the first subset of the received data corresponds to a first consecutive subset of logical block addresses (LBAs) in a series of LBAs and the remaining subset of the received data corresponds to a second consecutive subset of LBAs in the series, the first consecutive subset being continuous with the second consecutive subset.

16. The one or more computer-readable storage media of claim 15, wherein the computer process further comprises:
updating a cache reference table to include the first consecutive subset of LBAs corresponding to the first subset of the received data.

17. The one or more computer-readable storage media of claim 14, wherein writing the first subset of the received data to the media cache comprises:
reading data of the first track and the remaining number of tracks;
writing the read data into a scratchpad cache; and
modifying, in volatile memory, the read data to include the received of the write command.

18. The one or more computer-readable storage media of claim 17, wherein writing the first subset of the received data to the media cache further comprises:
determining that the first track to receive the data of the write command is also a first track of the shingled data band according to a sequential write order; and
responsive to the determining operation, writing the first subset of the received data to the media cache.

19. The one or more computer-readable storage of claim 18, wherein the first subset of the received data corresponds to a first consecutive subset of logical block addresses (LBAs) in a series of LBAs and the remaining subset of the received data corresponds to a second consecutive subset of LBAs in the series, the first consecutive subset being continuous with the second consecutive subset, and wherein the computer process further comprises updating a cache reference table to include the first consecutive subset of LBAs corresponding to the first subset of the received data.

20. The one or more computer-readable storage media of claim 14, the computer process further comprising:
copying the first subset of data from the media cache to the corresponding first data track at a time when there is no host activity.

* * * * *